US006616350B1

(12) United States Patent
de Boer et al.

(10) Patent No.: US 6,616,350 B1
(45) Date of Patent: Sep. 9, 2003

(54) METHOD AND APPARATUS FOR PROVIDING A MORE EFFICIENT USE OF THE TOTAL BANDWIDTH CAPACITY IN A SYNCHRONOUS OPTICAL NETWORK

(75) Inventors: Evert de Boer, Nepean (CA); Joseph Olajubu, Canvey Island (GB); Peter W. Phelps, Nepean (CA); Louis R. Paré, St-Bruno (CA); Darryl C. Ryan, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/471,141

(22) Filed: Dec. 23, 1999

(51) Int. Cl.[7] .................................. H04J 14/00
(52) U.S. Cl. ................. 398/9; 398/59; 398/45; 370/222; 370/223
(58) Field of Search .................. 359/110, 128, 359/222, 119; 370/221–224, 403–405, 452, 3, 460; 714/1–4; 709/251

(56) References Cited

U.S. PATENT DOCUMENTS 6,108,113 A * 8/2000 Fee .............................. 359/110
6,317,414 B1 * 11/2001 Naohiro ....................... 359/110

* cited by examiner

Primary Examiner—Leslie Pascal
Assistant Examiner—David C. Payne (57) ABSTRACT

The present invention relates to a local node for use in a synchronous optical network ring. The local node includes a group of working transmission lines and a protection line, for connecting to a remote node. The local node further includes a control unit for monitoring the working transmission lines and, upon detection of a data transmission impairment over a particular working transmission line, invoking a protection switch event causing re-routing of optical signals from the particular working transmission line to the protection line. Should the control unit detect simultaneous data transmission impairments over two or more working transmission lines, the control unit will choose to protect a particular working transmission line on the basis of a user-defined priority scheme.

36 Claims, 5 Drawing Sheets

PRIORITY TABLE FOR LOCAL NODE 108

| Working Transmission Line | Priority Level |
|---|---|
| 126 | 2 |
| 128 | 1 |
| 132 | 1 |
| 134 | 2 |

METHOD AND APPARATUS FOR PROVIDING A MORE EFFICIENT USE OF THE TOTAL BANDWIDTH CAPACITY IN A SYNCHRONOUS OPTICAL NETWORK

FIELD OF THE INVENTION

The present invention relates to the field of data transmission, such as data transmission that may occur in an optical network. More particularly, it pertains to a method and apparatus for providing a more efficient use of the total bandwidth capacity in a synchronous optical network.

BACKGROUND OF THE INVENTION

Within the ever-evolving telecommunications industry, the advent of numerous independent, localized networks has created a need for reliable inter-network communication. Unfortunately, this inter-network communication is difficult to accomplish in a cost-effective manner due to differences in the digital signal hierarchies, the encoding techniques and the multiplexing strategies. Transporting a signal to a different network requires a complicated multiplexing/demultiplexing, coding/decoding process to convert the signal from one scheme to another scheme. A solution to this problem is SONET, an acronym for Synchronous Optical NETwork. It is an optical transmission interface, specifically a set of standards defining the rates and formats for optical networks. Proposed by Bellcore during the early 80s and standardized by ANSI, SONET is compatible with Synchronous Digital Hierarchy (SDH), a similar standard established in Europe by ITU-T. SONET offers a new system hierarchy for multiplexing over modern high-capacity fiber optic networks and a new approach to Time Division Multiplexing (TDM) for small traffic payloads. SONET has several advantages, including:

- meeting the demands for increased network Operation and Maintenance (OAM) for vendors and users by integrating the OAM into the network, thus reducing the cost of transmission;
- standardizing the interconnection between different service providers (Mid-Span Meet);
- allowing the adding and/or dropping of signals with a single multiplexing process, as a result of SONET's synchronous characteristic.

The Synchronous Transport Signal (STS) frame is the basic building block of SONET optical interfaces, where STS-1 (level 1) is the basic signal rate of SONET. Multiple STS-1 frames may be concatenated to form STS-N frames, where the individual STS-1 signals are byte interleaved. The STS frame comprises two parts, the STS payload and the STS overhead. The STS payload carries the information portion of the signal, while the STS overhead carries the signaling and protocol information. This allows communication between intelligent nodes within the network, permitting administration, surveillance, provisioning and control of the network from a central location. At the ends of a communication system, signals with various rates and different formats must be dealt with. A SONET end-to-end connection includes terminating equipment at both ends, responsible for converting a signal from the user format to the STS format prior to transmission through the various SONET networks, and for converting the signal from STS format back to the user format once transmission is complete.

The optical form of an STS signal is called an Optical Carrier (OC). The STS-1 signal and the OC-1 signal have the same rate. The SONET line rate is a synchronous hierarchy that is flexible enough to support many different capacity signals. The STS-1/OC-1 line rate was chosen to be 51.84 Mbps to accommodate 28 DS1 signals and 1 DS3 signal. The higher level signals are obtained by synchronous multiplexing of the lower level signals. This higher level signal can be represented by STS-N or OC-N, where N is an integer. Currently the values of N are 1, 3, 12, 48 and 192. For example, OC-48 has a rate of 2488.320 Mbps, 48 times the rate of OC-1.

Existing optical networks can be formed by several interconnected rings, each ring formed itself by several nodes connected to one another. In a Bi-directional Line Switched Ring (BLSR), there exists between every two nodes of the ring both working and protection bandwidth. In the situation where the working bandwidth fails, the protection bandwidth is used to perform data transmission. In the situation where both working and protection bandwidth fail, the data transmission is re-routed around the ring using the protection bandwidth available between the other pairs of nodes within the ring.

In a four-fiber BLSR, two lines connect neighboring nodes, a working line and a protection line. The working line provides the working bandwidth and the protection line provides the protection bandwidth. Each line is formed of two fibers, one for each direction of traffic flow. Thus, the working line includes a send working fiber and a receive working fiber, while the protection line includes a send protection fiber and a receive protection fiber. The term "bi-directional" of BLSR refers to the fact that if one fiber of the working line fails, or if a piece of equipment to which one fiber of the working line is connected fails, traffic for both directions is re-routed. Specifically, if a working line suffers a data transmission impairment, either a fiber failure or an equipment failure, a span switch allows the protection line to be used as an alternate route of transmission. If both the working line and the protection line fail (link failure), or should there be a node failure, a ring switch allows for the data transmission to be re-routed around the ring via the other nodes in the ring network, specifically over the different protection lines. Both the span switch and the ring switch are different forms of protection switching.

Optical networks such as the BLSR are no longer used simply to transmit voice data, but rather are now carrying more and more pure data such as Internet traffic in addition to voice data. Network users are demanding greater bandwidth capacity and are requiring less and less protection of the data transmissions, due to the very nature of the Internet, within which routers take care of re-routing traffic when failures occur.

One solution to provide greater bandwidth capacity currently in implementation is the use of stacked overlaid BLSRs. For each node within a BLSR, a second (sister) node is installed at the same site. The two nodes at each site are inter-connected using new fibers and exchange complicated signaling control information. In addition, the new nodes are all inter-connected by a second ring using new fibers, thus forming a second, stacked ring. Unfortunately, this solution is very expensive to implement and is still limited with respect to the amount of working bandwidth available to customers, due to the reservation of one protection fiber for each working fiber.

Another solution is the implementation of a mesh network, in which any one node may be connected to any other node of the network. Although this solution is theoretically proven to be less expensive to implement than a BLSR and to provide greater bandwidth capacity to network users, it becomes very complicated to provide an adequate level of protection within the mesh network.

The background information provided above clearly indicates that there exists a need in the industry to provide a method and apparatus for increasing the degree of utilization of the total available bandwidth in optical networks such as to either transmit more data or reduce the infrastructure necessary to transmit the same amount of data.

SUMMARY OF THE INVENTION

The present invention provides in one aspect a local node for use in a synchronous optical network ring. The local node includes a group of working transmission lines for exchanging data with a remote node in the network, and a single protection line associated with the group of working transmission lines for exchanging data with the remote node in the event of a data transmission impairment on any one of the working transmission lines. The node is operative to monitor the working transmission lines and, upon detection of a transmission impairment over any one of the working transmission lines, invoke a protection switch event whereby the traffic normally sent over the working transmission line that suffers the impairment is re-routed over the protection line. This protection switch event is referred to as a span switch.

The local node as described above yields either one of two possible benefits. If the user requires an increase of bandwidth capacity, this can be accomplished by converting an existing protection line to a working transmission line. On the other hand, if a reduction in the infrastructure is desired, while maintaining the existing working transmission line capacity, this can be accomplished by reducing the number of protection lines with respect to the number of working transmission lines.

It should be appreciated that the invention is not limited to a single protection line per local node. The local node may comprise a plurality of protection lines where each protection lines services a group of working transmission lines.

In this specification, "data transmission impairment" refers to a condition that either negates or reduces the ability of a working transmission line to carry data to the intended destination. A "data transmission impairment" occurs when a fiber is cut, or intermediate equipment malfunctions such as to totally interrupt the data traffic, also referred to as a fiber failure. A "data transmission impairment" also occurs when the fiber or intermediate equipment is rendered partially inoperative such that not all traffic is lost, but the normal capabilities of the working transmission line are significantly diminished. Further, a "data transmission impairment" occurs when a node within the network becomes inoperative, also referred to as a node failure, or when the link connecting two adjacent nodes within the network becomes inoperative such that no traffic may be exchanged between the two nodes over any one of the working transmission lines and protection line, also referred to as a link failure.

In a specific example of implementation, each working transmission line includes a send connection for sending optical signals to the remote node and a receive connection for receiving optical signals from the remote node. A data transmission impairment detected over a particular working transmission line may be a malfunction over either one of the receive and send connections of the particular working transmission line.

Since a single protection line is available to protect multiple working transmission lines, it has been found advantageous, although not necessarily essential, to the invention to provide each group of working transmission lines that connects the node to an adjacent node in the network ring with a user-defined priority scheme. In a specific non-limiting example of implementation, the priority scheme assigns a priority level to each working transmission line of the group. In the case of fiber failures over multiple working transmission lines between two adjacent nodes, protection switching is implemented on the basis of the priority scheme.

In a specific non-limiting example of implementation of the invention, the protection line also serves to implement a different type of protection, notably ring protection. Ring protection ensures that if a link failure occurs between the node and a first adjacent node (i.e. all working lines and protection line suffer from a data transmission impairment) or a node failure occurs at the first adjacent node, an alternate route will be used in order to ensure traffic flow. This alternate route is via a second adjacent node and, subsequently, the other nodes within the network ring, using the available protection bandwidth.

In a specific non-limiting form of realization, a local node implementing the principle of the invention is one component of a synchronous optical network, where this network comprises a ring inter-connecting two remote telephone instruments (also referred to as Customer Premises Equipment (CPE)). The telephone instruments are therefore the end-points for a SONET connection. Alternatively, the end-points for the SONET connection could be the modems of two remote computers. The ring is an OC-192 ring, where the optical signal being transmitted within each ring is an OC-192. Alternatively, the end-points may be inter-connected by multiple rings of various types, for example an OC-48 ring and an OC-192 ring. The local node is connected to a remote, adjacent node by three lines, two working transmission lines and a protection line. Each line is implemented by a fiber pair, one fiber for each direction of traffic flow, thus implementing both a send and a receive connection. The working transmission lines are regularly used for the exchange of traffic between the two adjacent nodes. If the send or receive fiber of a working transmission line should suffer a data transmission impairment, the protection line will assume transmission duties for this working transmission line.

In a specific non-limiting example of implementation, the local node is analogous to a computing device structurally comprised of a control unit and several interfaces, the control unit itself including a memory and a processor. An internal system bus interconnects these components, enabling data and control signals to be exchanged between them. The interfaces interconnect various bi-directional ports to their respective physical paths, including both the working transmission lines and the protection line, such that the local node may exchange data with remote, adjacent nodes.

The memory contains a program element that controls the operation of the local node. This program element is comprised of individual instructions that are executed by the processor, implemented in the form of a Central Processing Unit (CPU). In addition, the memory provides random access storage, capable of holding data elements that the controller manipulates during the execution of the program. For all transmission nodes within SONET rings, the execution of the program element by the processor ensures standard data transmission and error/failure monitoring, including the multiplexing and de-multiplexing of optical signals as well as standard protection switching support.

Specific to a non-limiting example of realisation of the present invention, the execution of the program element stored in the memory of the local node ensures span and ring switching on the basis of a single protection line available to multiple working transmission lines between the local node and its remote, adjacent nodes. Accordingly, the memory also supports a user-defined priority table that maps a priority level to each working transmission line connected to the local node for exchanging data with adjacent nodes, grouped by transmission span. Note that both fibers of a particular working transmission line are assigned the same priority level.

In one possible form of implementation, the control unit itself is responsible for monitoring the working transmission lines for the presence of a data transmission impairment, where such an impairment could result in the loss of intraring data incoming from an adjacent node. This verification may be effected by constantly monitoring incoming lines for manifestations of data transmission impairments that indicate a loss of data. Examples of manifestations of data transmission impairments are Loss of Signal, Loss of Pointer, Line Alarm and Path Alarm. These data transmission impairments are reported in the SONET overhead. When the control unit detects a data transmission impairment, be it a fiber failure, a node failure or a link failure, the control unit responds to this data transmission impairment by invoking a protection switch event.

In the case of a fiber failure, the protection switch event could be a span switch. In the situation where the control unit detects multiple simultaneous fiber failures over different working transmission lines between the node and a particular adjacent node, the control unit consults the priority table to determine which of the working transmission lines is to be protected. The control unit then invokes the span switch for the working transmission line having the highest priority level. The working transmission line that goes unprotected due to a lower priority level is squelched by the control unit, whereby the control unit generates an error signal, predetermined within the network ring as being representative of a fiber failure. This error signal is sent back to the end points of the SONET connection (CPEs), such that the end points are informed of the data transmission impairment within the network. In a specific non-limiting example, the error signal is a particular sequence of bits.

In the case of a link or node failure, the protection switch event is a ring switch. When the control unit detects a link or node failure, it consults the priority table to determine which working transmission line among those affected by the data transmission impairment is to be protected. Whether the data transmission impairment is a link failure between the node and a particular adjacent node or a node failure at a particular adjacent node, the control unit determines from the priority table the working transmission line having the highest priority level for the group of working transmission lines corresponding to the transmission span between the node and the particular adjacent node. The control unit next invokes the ring switch for the working transmission line having the highest priority level, such that data transmissions over this working transmission line are re-routed around the ring using the available protection bandwidth. As described above, the control unit squelches a working transmission line that goes unprotected due to a lower priority level.

Note that for both a span and a ring switch, all nodes of the network ring are advised of the protection switch, through signaling information generated by the particular node that detects the data transmission impairment, be it a fiber, link or node failure, and implements the protection switch. This signaling information provides details as to the type of data transmission impairment, as well as to the particular working fiber (and thus working transmission line) that is being protected by the protection switch.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appended claims.

DETAILED DESCRIPTION

Figure 1:
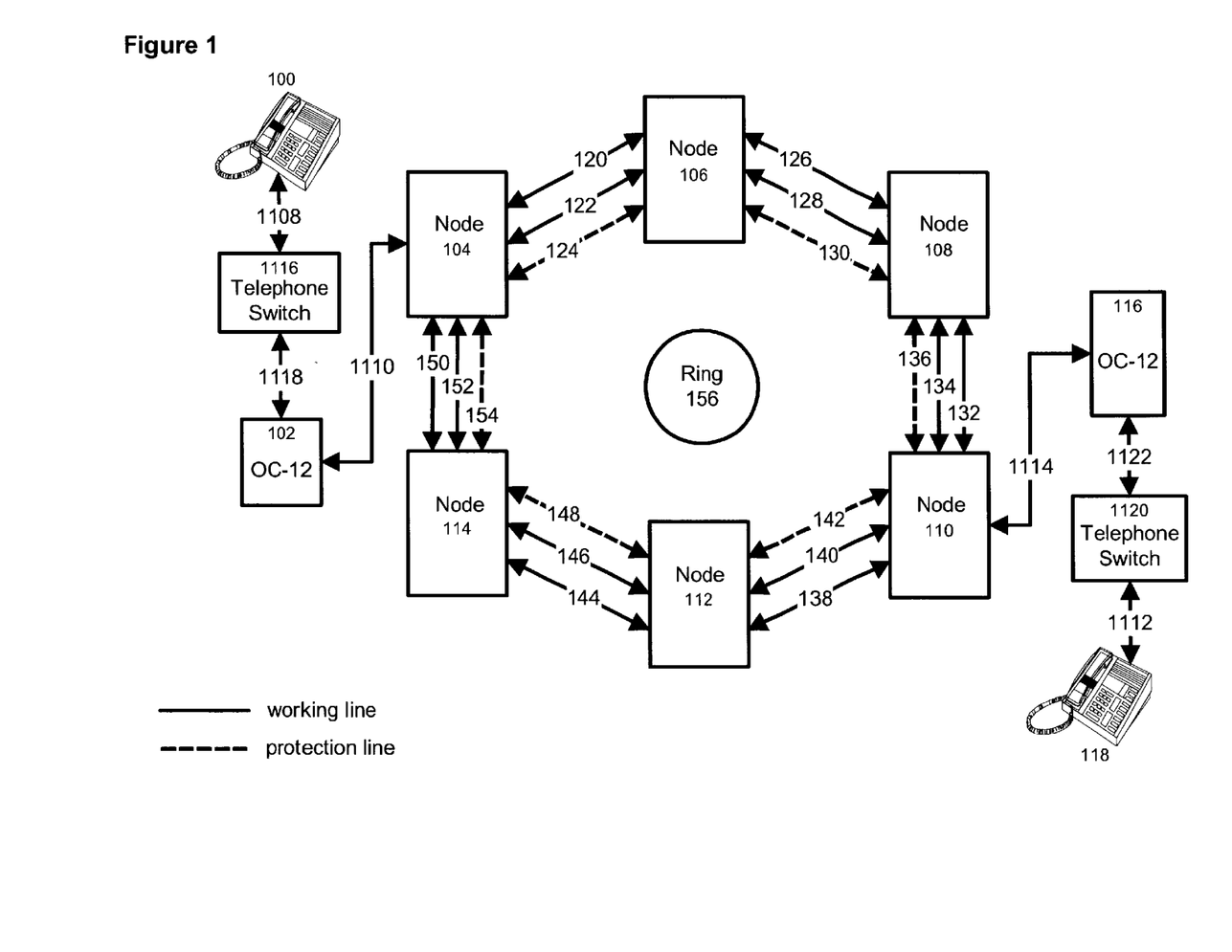
FIG. 1 is a block diagram of a synchronous optical network including a plurality of nodes, in accordance with an embodiment of this invention.

FIG. 1 illustrates an example of a situation where two remote telephones 100 and 118 are connected via a synchronous optical network, the latter being implemented by a single ring 156. Alternatively, the network could include several more rings, as well as one or more linear point-to-point connections, all inter-connected. The telephones are therefore the end-points for a SONET connection. Alternatively, the end-points for the SONET connection could be the modems of two remote computers.

Current SONET standards support the transmission of OC-1, OC-3, OC-12, OC-48 and OC-192 optical signals. In a specific non-limiting example of implementation, ring 156 is an OC-192 ring, where the optical signals being transmitted are OC-192 signals.

In FIG. 1, ring 156 is formed by several transmission nodes, specifically nodes 104, 106, 108, 110, 112 and 114. Each of these nodes can receive externally created OC-3, OC-12 or OC-48 optical signals, and multiplex those into an OC-192 optical signal for transmission within ring 156. The OC-3, OC-12 or OC-48 signals come from an OC-3, OC-12 or OC-48 system that receives electrical signals. In the example of FIG. 1, a call from phone 100 is sent over the electrical line 1108 to a telephone switch 1116. This switch routes the call and multiplexes 24 such calls, all arriving from different points of origin, into a single electrical signal, known as a DS1. The DS1 is then sent over another electrical line 1118 to an OC-12 node 102, where a maximum of 336 DS1 signals are multiplexed into one OC-12 optical signal. Next, the OC-12 optical signal is sent over a fiber 1110 to an OC-192 node 104. This OC-192 node 104 can multiplex 16 such OC-12 signals into a single OC-192 signal, which represents approximately 130 000 voice calls. The OC-192 optical signal is routed through the optical network, from transmission node to transmission node, until it reaches the receiving OC-192 node 110, where it is de-multiplexed into 16 OC-12 optical signals. The above process then repeats itself in reverse order, until the original voice call is transmitted over an electrical line 1112 to the destination party's phone 118. As both the telephone switch and the OC-12 nodes are well known to those skilled in the art, and are not critical to the success of this invention, they will not be described in further detail.

Specific to an embodiment of the present invention, two adjacent nodes within the network ring are inter-connected by several working lines and a single protection line. In a specific example, three lines are used to connect two adjacent nodes: two working transmission lines and one protection line. Each line is implemented by a fiber pair, one fiber for each direction of traffic flow, thus implementing both a send and a receive connection. The working transmission lines are regularly used for the exchange of traffic between the two adjacent nodes. The protection line, also implemented by a fiber pair, ensures protection switching between the two adjacent nodes and within the network ring, as will be described in further detail below. It is important to note that a single protection line is available to multiple working lines between two adjacent nodes, as opposed to the existing BLSR implementation of one protection line for each working line.

Note that specific to this non-limiting embodiment, the ring 156 is modeled after a BLSR, such that the bi-directional characteristic as described above applies to ring 156. Alternatively, ring 156 could be modeled after a uni-directional line switched ring, whereby when a particular fiber of a line suffers a data transmission impairment, only the traffic for the particular fiber is re-routed to the protection line.

In the example shown in FIG. 1, nodes 104 and 106 of the ring 156 are adjacent and inter-connected by three lines. Lines 120 and 122 are the working transmission lines, used to support the exchange of data between nodes 104 and 106, while line 124 is the protection line. In the case where data is being sent from node 106 to node 104, assume that the working transmission line 120 is the first choice transmission path. If the corresponding send fiber of the working transmission line 120 should suffer a data transmission impairment, such as a fiber failure, the protection line 124 will assume transmission duties. This switching of transmission duty from a working transmission line to the corresponding protection line is referred to as a span switch, and may be implemented for any working transmission line within the ring 156. The term "span switch" implies that in the case of a data transmission impairment over a working transmission line of a span (possibly due to a fiber cut or other), the protection line for the span can be used as a back-up for traffic transmission.

Since a single protection line serves as a back-up for multiple working transmission lines, all of the working transmission lines can not be protected simultaneously. Associated with each group of working transmission lines that connect two adjacent nodes in the network ring is a user-defined priority scheme. The priority scheme assigns a priority level to each of the working transmission lines for a particular transmission span. In the case of multiple simultaneous data transmission impairments over different working transmission lines between two adjacent nodes, protection switching is provided on the basis of the priority scheme. Upon setup of the synchronous optical network, the priority scheme is initialized to a default scheme, whereby all working transmission lines are assigned the same priority. The priority scheme for use by a particular node in the network ring may later be modified to reflect user preferences. Note that both fibers of a particular working transmission line are assigned the same priority level.

Figure 2:
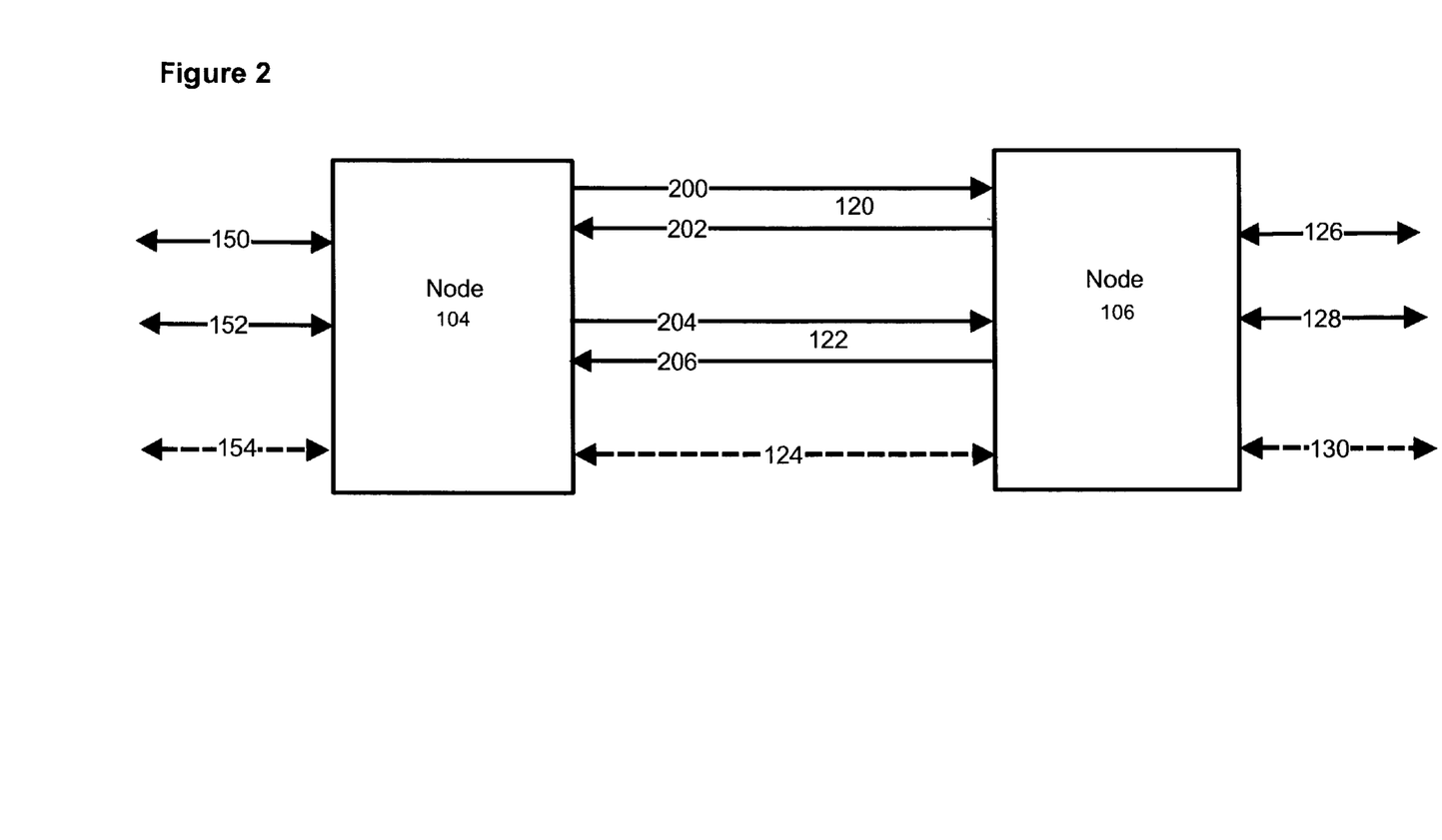
FIG. 2 is a block diagram of the fiber connections between two nodes of the optical network shown in FIG. 1.

Continuing the above example of nodes 104 and 106, FIG. 2 depicts the fiber connections between the two nodes, where fibers 200 and 202 correspond to line 120 and fibers 204 and 206 correspond to line 122. Assume that, as per the user-defined priority scheme, working line 120 is ranked at a higher priority level than working line 122. Should fibers 200 and 204 simultaneously suffer data transmission impairments, the protection line 124 will assume transmission duties for working transmission line 120, on the basis of its higher priority level. Working transmission line 122 will go unprotected and its data transmissions will be lost.

The protection line inter-connecting two adjacent nodes also serves to implement a different type of protection, notably ring protection. Ring protection ensures that if a link failure occurs between two adjacent nodes (i.e. all working transmission lines and protection line suffer from a data transmission impairment) or a node failure occurs within the network ring, an alternate route will be used in order to ensure traffic flow.

Referring to FIG. 1, assume for example that unidirectional traffic is to flow from node 104 to node 108, specifically over working lines 120 and 126. However, due to a link failure between nodes 106 and 108, the transfer of traffic from node 106 to node 108 is impossible. In such a case, ring protection ensures that traffic arriving at node 106 from node 104 is re-routed back to node 104 over protection line 124, at which point the traffic is sent to node 108 via nodes 114, 112 and 110, over protection lines 154, 148, 142 and 136. Therefore, no traffic loss occurs within the ring 156. A similar scenario takes place in the case of a node failure.

The above-described priority scheme will also be used to determine which working line is to be protected via ring protection in the case of data transmission impairment due to a node or link failure. Continuing with the above example of FIG. 2, assume that a node failure occurs at node 106. Given a priority scheme by which line 120 has a higher priority level than line 122, the protection line 154 will assume transmission duties for working transmission line 120, such that data transmissions from node 104 to node 106 over line 120 are re-routed around the ring 156. The data transmissions from node 104 to node 106 over line 122 will go unprotected. A similar scenario takes place in the case of a link failure.

Figure 3:
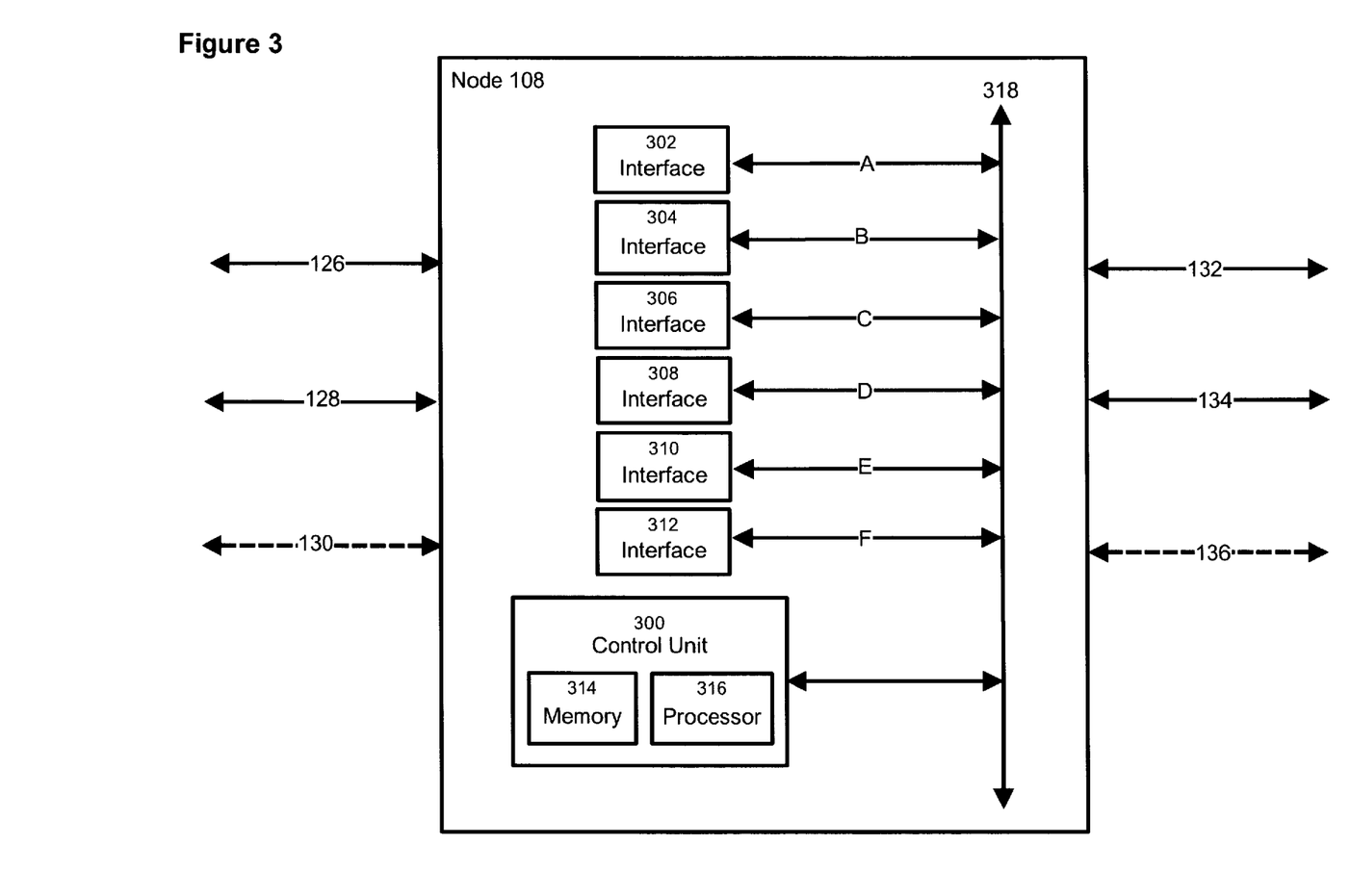
FIG. 3 is a structural block diagram of a node from the optical network shown in FIG. 1.

The general structure of a node constructed in accordance with an example of implementation of the present invention is shown in FIG. 3, specifically local node 108. Each transmission node within a SONET ring is a separate physical structure and, in practice, may be located between 80 and 100 kilometers from an adjacent transmission node. As seen in FIG. 3, local node 108 is implemented on what is referred to as a switch card, the card comprised of a control unit 300, interfaces 302, 304, 306, 308, 310 and 312 and an internal system bus 318. The control unit 300 includes a memory 314 and a processor 316, and is responsible for implementing the functionality of the local node 108. The control unit 300 further implements several protection switching mechanisms, such that data transmissions involving node 108 are protected, as will be described in further detail below. In this specific example of implementation, the protection switching mechanisms are implemented by software executed by the processor 316, as will be described in further detail below.

The internal system bus 318 interconnects the various components of the local node 108, enabling data and control signals to be exchanged between them. The node has 6 bi-directional ports, identified as ports A through F. Four of these ports connect the local node 108 to working transmission lines 126, 128, 132 and 134, specifically ports A, B, D and E, respectively, allowing data to be received from and passed to remote, adjacent transmission nodes 106 and 110 within the ring 156. Ports C and F connect the local node 108 to protection lines 130 and 136, respectively, ensuring that local node 108 supports protection switching. In general, a bi-directional port is designed to receive data from the receive fiber and to transmit data over the send fiber of the associated working transmission line.

The electro-optical interfaces 302, 304, 306, 308, 310 and 312 interconnect the various ports to their respective physical fibers. These electro-optical interfaces are responsible for the conversion of incoming optical signals into electrical signals, as well as for the transmission of these electrical signals to the internal system bus 318 for transport to the memory 314 where they can be processed by the processor 316. On the output side, the electro-optical interfaces are also designed to accept outgoing electrical signals from the memory 314 through the system bus 318, and convert these electrical signals into optical signals prior to their release into the optical network. It is not deemed necessary to discuss the standard transmission and signal conversion operations of the interfaces in more detail because it is well known to those skilled in the art and is not critical to the success of the invention.

In a specific example of implementation, an interface and its corresponding port, including a send and a receive connection, are implemented in hardware by an optic card. Thus a node having two working transmission lines and a protection line for connection to one adjacent node, and a separate two working transmission lines and protection line for connection to another adjacent node, requires 6 optic cards.

The memory 314 contains a program element that controls the operation of the local node 108. This program element is comprised of individual instructions that are executed by the processor 316, implemented as a Central Processing Unit (CPU). The memory 314 further holds a routing table that maps the destination addresses of incoming data packets to the various ports of local node 108. It is not deemed necessary to further discuss the structure of the routing table here because this component is not critical to the success of the invention and also it would be well known to a person skilled in the technological field to which the present invention belongs. In addition, the memory 314 provides random access storage, capable of holding data elements that the processor 316 manipulates during the execution of the program.

Note that for all transmission nodes within the SONET ring 156, the execution of the program element by the processor 316 ensures standard data transmission and error/failure monitoring, including the multiplexing and de-multiplexing of optical signals. Such functionality is well known to those skilled in the art and therefore will not be described in more detail.

The above structural description of a transmission node has the purpose of presenting certain components of such a transmission node, and is in no way intended to limit the scope of the present invention to just these components. The optical network transmission node could alternatively include additional components with various functionalities inherent to SONET transmission.

Figure 4:
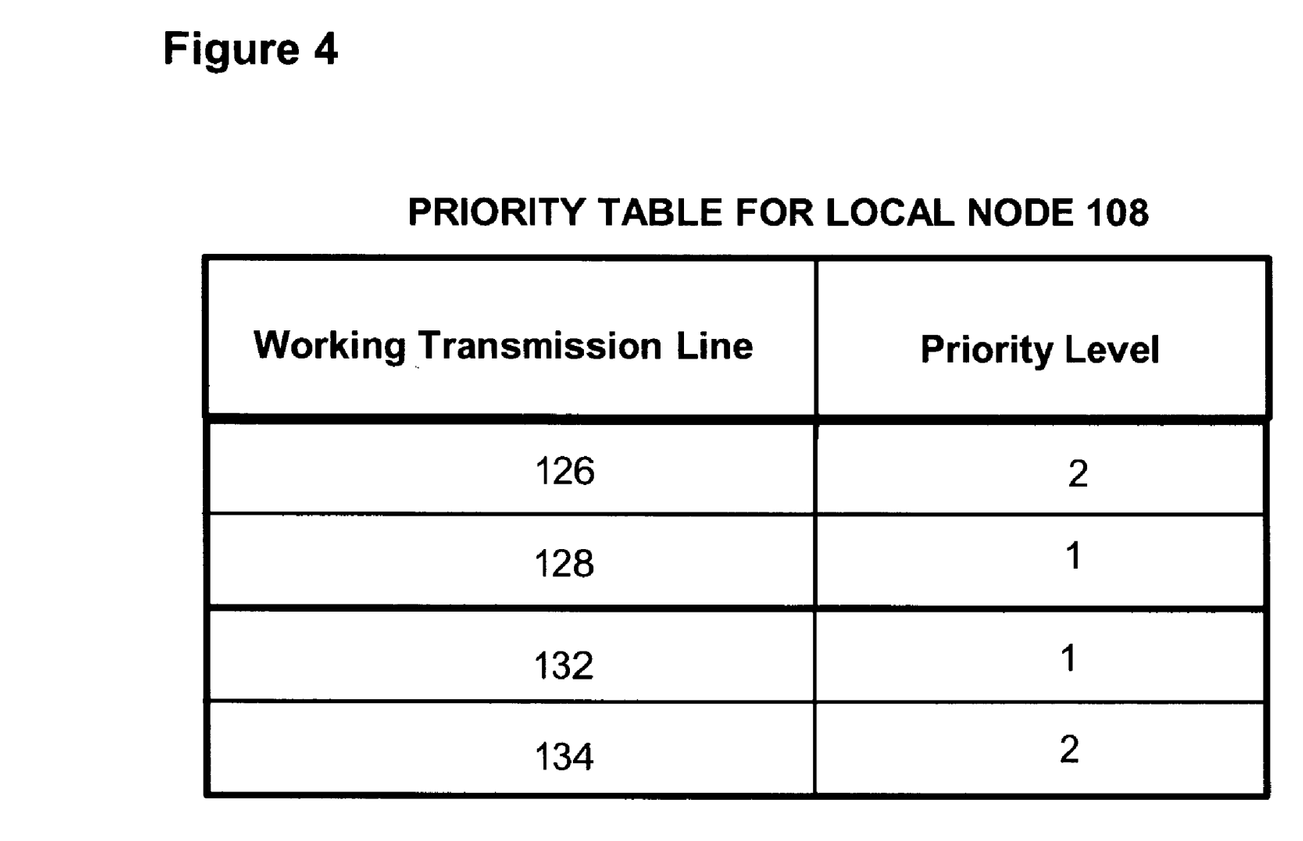
FIG. 4 illustrates an example of a priority table used by the node shown in FIG. 3.

Specific to the present invention, the execution of the program element stored in the memory of local node 108 further ensures span and ring switching on the basis of a single protection line available to protect multiple working transmission lines between local node 108 and its remote, adjacent nodes. Accordingly, the memory 314 also supports a user-defined priority table that maps a priority level to each working transmission line connected to the local node 108 for exchanging data with adjacent nodes, grouped by transmission span. Specifically, the lines in the group of working transmission lines connecting local node 108 to remote, adjacent node 106 are ranked by priority, while the lines in the group of working transmission lines connecting local node 108 to adjacent node 110 are separately ranked by priority. An example of the priority table for node local 108 is shown in FIG. 4.

The control unit 300 implements two protection switching mechanisms (also referred to as events): a span switch and a ring switch. As described above, the control unit 300 is responsible for standard error/failure monitoring of the working transmission lines 126, 128, 132 and 134. This verification may be effected by constantly monitoring incoming lines for data transmission impairments that indicate a loss of data. Examples of these data transmission impairments are Loss of Signal, Loss of Pointer, Line Alarm and Path Alarm. These data transmission impairments are reported in the SONET overhead. When the control unit 300 detects a data transmission impairment, be it a fiber failure, a node failure or a link failure, the control unit 300 responds to this data transmission impairment by invoking a protection switch event.

In the case of a fiber failure, the protection switch event is a span switch, whereby the appropriate protection line (protection line 130 in the case of a fiber failure of lines 126 or 128, protection line 136 in the case of a fiber failure of lines 132 or 134) assumes the duty of transmission for the working transmission line having experienced the fiber failure. In the situation where the control unit 300 detects multiple simultaneous fiber failures over different working transmission lines between node 108 and a particular adjacent node, the control unit 300 consults the priority table to determine which of the working transmission lines is to be protected. The control unit then invokes the span switch for the working transmission line characterized by the highest priority level. The working transmission line that goes unprotected due to a lower priority level is squelched by the control unit 300, whereby the control unit 300 generates an error signal, predetermined within the network ring 156 as being representative of a fiber failure. This error signal is sent back to the end points of the SONET connection (CPEs), such that the end points are informed of the data transmission impairment within the network. In a specific non-limiting example, the error signal is a particular sequence of bits.

In the case of a link or node failure, the protection switch event is a ring switch, whereby the data transmissions of a particular working transmission line connecting local node 108 to a remote, adjacent node are re-routed around the ring 156 via the other adjacent node and, subsequently, the other nodes of the ring 156, using the available protection bandwidth. When the control unit 300 detects a link or node failure, it consults the priority table to determine which working transmission line among those affected by the data transmission impairment is to be protected. Whether the data transmission impairment is a link failure between local node 108 and a particular remote, adjacent node or a node failure of a particular remote, adjacent node, the control unit 300 determines from the priority table the working transmission line having the highest priority level among the group of working transmission lines corresponding to the transmission span between the local node 108 and the particular adjacent node. The control unit 300 next invokes the ring switch for the working transmission line characterized by the highest priority level, such that data transmissions over this working transmission line are re-routed around the ring 156 using the available protection bandwidth. As described above, the control unit 300 squelches a working transmission line that goes unprotected due to a lower priority level.

Note that for both a span and a ring switch, all nodes of ring 156 are advised of the protection switch, through signaling information generated by the particular node that detects the data transmission impairment, be it a fiber, link or node failure, and implements the protection switch. This signaling information provides details as to the type of data transmission impairment, as well as to the particular working transmission line that is being protected by the protection switch.

In a specific example of implementation, k-byte signaling is used between the various nodes of the ring 156 to signal that a data transmission impairment (fiber, link or node) has been detected. K-byte signaling is defined by a Bellcore standard within synchronous optical networks, and consists in 2 bytes (k-bytes) of the SONET overhead that are reserved for signaling detected data transmission impairments within the network to the various network nodes. In a specific example, node 104 detects a node failure at node 106. Upon receipt of traffic to be forwarded to node 106, node 104 is operative to modify the SONET overhead of this traffic such that the k-bytes are indicative of a node failure at node 106. Node 104 will next re-route the traffic around the ring via adjacent node 114 and, subsequently, the other nodes of the ring 156. Each node in the ring 156 is operative to check the SONET overhead of incoming traffic, and thus will detect the failure at node 106 through reading of the k-bytes. Since k-byte signaling is well known to persons skilled in the art, and has been well documented, it will not be described in further detail.

Specific to the present invention, the k-byte signaling implemented within the ring 156 may be extended to use 3 bytes of the SONET overhead since, in the case of a node failure, a link failure or multiple working fiber failures between two adjacent nodes, details as to the particular working transmission line being protected are required. The latter information is above and beyond information relative to the type of data transmission impairment detected, currently provided by k-byte signaling in existing synchronous optical networks. Details as to the particular working transmission line being protected must be received by the nodes at either end of the data transmission impairment, in particular in the case of a node or link failure, such that the traffic being protected is properly re-routed within the network.

In a specific example, assume that a uni-directional connection is to be made from node 104 to node 110, over working transmission lines 120, 126 and 132. Given a node failure at node 106, and assuming that working transmission line 120 has a higher priority level than working transmission line 122, node 104 performs a ring switch, whereby data to be sent over working transmission line 120 is re-routed around the ring via the protection bandwidth. The node 104 modifies the k-bytes in the SONET overhead of this re-routed traffic, in order to indicate that a node failure at node 106 has occurred and that working transmission line 120 is being protected, and sends the traffic over protection line 154. The traffic is then passed over protection lines 148, 142 and 136, until it arrives at node 108. Since the modified k-bytes inform node 108 that a failure has occurred at node 106 and that the protected traffic being re-routed corresponds to traffic from working transmission line 120, node 108 connects the protection line 136 to the working transmission line 132 and sends the re-routed traffic over working transmission line 132 to node 110. Thus, the original connection is properly completed.

Figure 5:
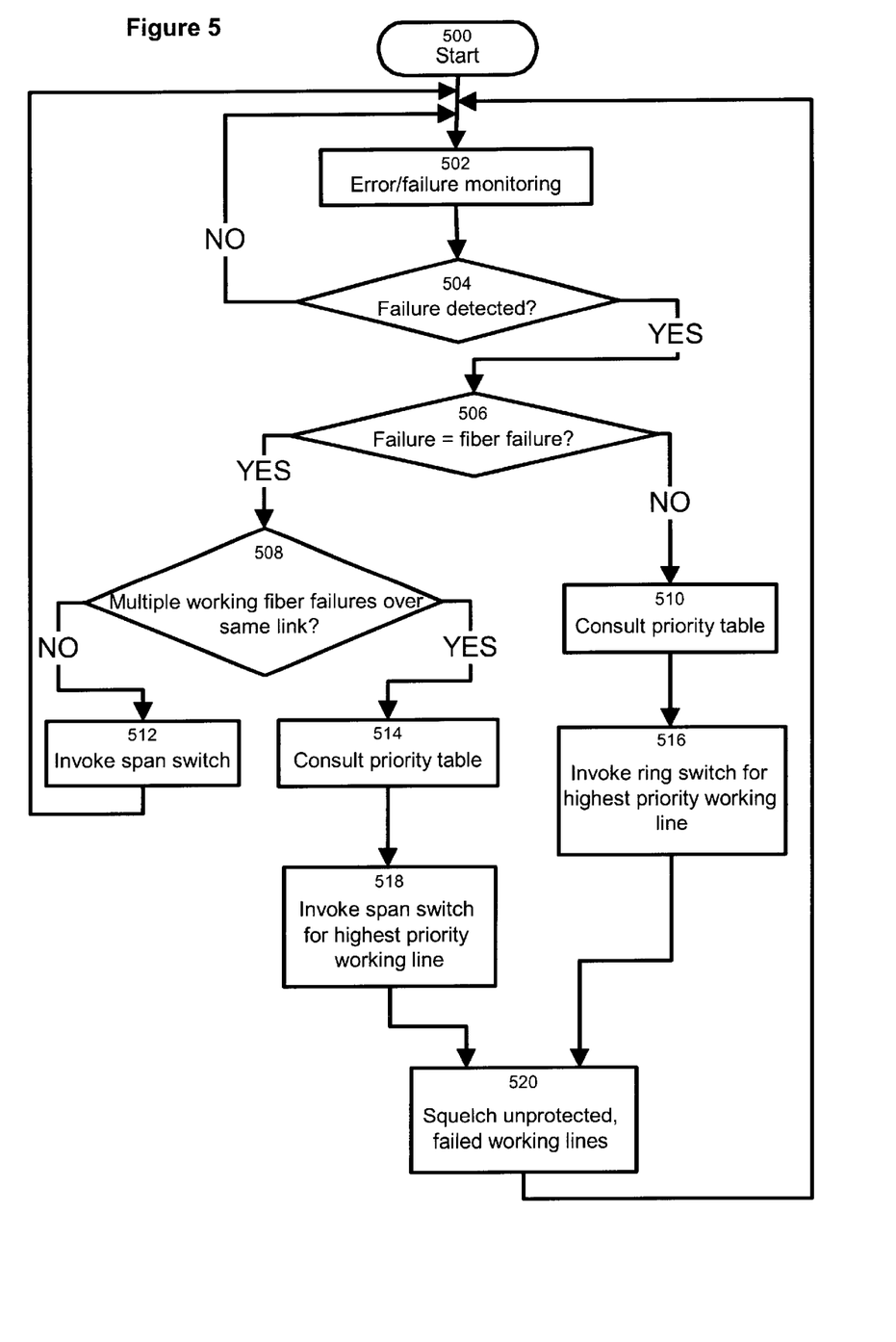
FIG. 5 is a flow chart illustrating the operation of a program element in the node depicted in FIGS. 1 and 3, which controls the protection switching functionality.

FIG. 5 provides a complete flowchart illustrating an example of the operation of the program element stored in the memory 314, and executed by the processor 316, of the control unit 300 that regulates the operation of the local node 108, in particular the protection switching functionality. At step 502, the control unit 300 performs error/failure monitoring. One of three types of data transmission impairments may be detected, specifically a fiber failure, a node failure or a link failure. If a data transmission impairment is detected, at step 504, the control unit determines the type of data transmission impairment at step 506. If the data transmission impairment is recognised as being a fiber failure over a link between local node 108 and a remote adjacent node, the control unit 300 will check for multiple, simultaneous fiber failures over different working transmission lines of the same link at step 508. If only one working fiber failure is detected, a span switch is invoked at step 512, transferring the duties of transmission from the failed working fiber to the corresponding protection line of the link. The control unit 300 uses k-byte signaling to advise the other nodes in the ring 156 of the span switch.

If multiple fiber failures are detected simultaneously over different working lines of a single link at step 508, the control unit 300 consults the priority table in memory 314 at step 514 to determine the working transmission line characterised by the highest level of priority. At step 518, a span switch is invoked, transferring the duties of transmission from the failed working transmission line characterised by the highest level of priority to the corresponding protection line of the link. The control unit 300 uses k-byte signaling to advise the other nodes in the ring 156 of the span switch, specifically the particular working transmission line being protected by the span switch.

If at step 506 the data transmission impairment is recognised as being a link failure between local node 108 and a particular remote, adjacent node, or a node failure of a particular remote, adjacent node, the control unit 300 will consult the priority table in memory 314 at step 510. The control unit 300 determines from the priority table, for the span between local node 108 and the particular adjacent node, the working transmission line that is characterized by the highest level of priority. At step 516, a ring switch is invoked, thus re-routing the data transmissions from the failed working transmission line characterised by the highest priority level around the ring 156, via the other adjacent node of local node 108 and, subsequently, the other nodes of the ring 156. The control unit 300 uses k-byte signaling to advise the other nodes in the ring 156 of the ring switch, specifically the particular working transmission line being protected by the ring switch.

Whether the control unit 300 invokes a span switch at step 518 or a ring switch at step 516, the failed working transmission lines that go unprotected due to lower priority levels are squelched at step 520, whereby the appropriate error signal is sent back to the end points of the SONET connection (CPEs).

It is important to note that within the ring 156, when single working fiber failures occur over different links (spans), span switches can be active at the different spans, where for each span a different working fiber can be protected. Thus, multiple working fiber failures can be corrected simultaneously within the ring 156.

In another example of implementation of the present invention, each node of the synchronous optical network ring is operative to detect multiple, simultaneous data transmission impairments over different working transmission lines of a particular span and to implement protection switching in order to protect two of the simultaneously failed working transmission lines. Specifically, the node will consult the priority table in order to determine the priority levels for the group of working transmission lines corresponding to the particular span, and will perform both a span switch and a ring switch on the basis of the priority scheme. In particular, the node will perform a span switch to protect the failed working transmission line characterized by the highest priority level and a ring switch to protect the failed working transmission line characterized by the second highest priority level.

The above description of a preferred embodiment under the present invention should not be read in a limitative manner as refinements and variations are possible without departing from the spirit of the invention. The scope of the invention is defined in the appended claims and their equivalents.

We claim:

1. A local node for use in a synchronous optical network ring, said local node comprising:
   a first group of working transmission lines for exchanging data with a first remote node in the network;
   a first protection line associated with said first group of working transmission lines, said first protection line being capable of exchanging data with the first remote node in the network;
   a second group of working transmission lines for exchanging data with a second remote node in the network, different from the first remote node;
   a second protection line associated with said second group of working transmission lines, said second protection line being capable of exchanging data with the second remote node in the network;
   a control unit operative to monitor said first and second groups of working transmission lines and:
      a) upon detection of a data transmission impairment of a first type over any one of the lines in the first group of working transmission lines, invoke a first protection switch event causing re-routing of optical signals from the working transmission line on which the data transmission impairment of the first type has been detected to said first protection line;
      b) upon detection of a data transmission impairment of a second type between said local node and the first remote node, invoke a second protection switch event causing re-routing of optical signals from a particular working transmission line of said first group of working transmission lines to said second protection line.

2. A local node as defined in claim 1, wherein said control unit is further operative to invoke a third protection switch event upon detection of a data transmission impairment of the first type over any one of the lines in the second group of working transmission lines, the third protection switch event causing re-routing of optical signals from the working transmission line on which the data transmission impairment of the first type has been detected to said second protection line.

3. A local node as defined in claim 2, wherein said control unit is further operative to invoke a fourth protection switch event upon detection of a data transmission impairment of the second type between said local node and the second remote node, the fourth protection switch event causing re-routing of optical signal from a particular working transmission line of said second group of working transmission lines to said first protection line.

4. A local node as defined in claim 3, wherein each of said first and third protection switch events is a span switch, and each of said second and fourth protection switch events is a ring switch.

5. A local node as defined in claim 3, wherein each one of the lines of said first group of working transmission lines and said first protection line includes a receive connection for receiving optical signals from the first remote node and a send connection for transmitting optical signals to the first remote node.

6. A local node as defined in claim 5, wherein each one of the lines of said second group of working transmission lines and said second protection line includes a receive connection for receiving optical signals from the second remote node and a send connection for transmitting optical signals to the second remote node.

7. A local node as defined in claim 6, wherein a data transmission impairment of the first type detected over a particular working transmission line of either one of said first and second groups of working transmission lines is selected from the group consisting of a data transmission impairment over the receive connection of the particular working transmission line and a data transmission impairment over the send connection of the particular working transmission line.

8. A local node as defined in claim 7, wherein each line of said first group of working transmission lines is assigned a priority level, whereby one line of said first group of working transmission lines has a higher priority level than another line of the same group.

9. A local node as defined in claim 8, wherein, upon detection of a data transmission impairment of the first type over two or more lines of said first group of working transmission lines, said control unit is operative to select one of the two or more working transmission lines suffering from the data transmission impairment of the first type and re-route optical signals from the selected working transmission line to said first protection line, on the basis of the priority levels of the two or more working transmission lines suffering from the data transmission impairment of the first type.

10. A local node as defined in claim 9, wherein each line of said second group of working transmission lines is assigned a priority level, whereby one line of said second group of working transmission lines has a higher priority level than another line of the same group.

11. A local node as defined in claim 10, wherein, upon detection of a data transmission impairment of the first type over two or more lines of said second group of working transmission lines, said control unit is operative to select one of the two or more working transmission lines suffering from the data transmission impairment of the first type and re-route optical signals from the selected working transmission line to said second protection line, on the basis of the priority levels of the two or more working transmission lines suffering from the data transmission impairment of the first type.

12. A local node as defined in claim 11, wherein, for each of said first and second groups of working transmission lines, the working transmission line selected by said control unit is the working transmission line assigned the highest priority level among the two or more working transmission lines suffering from the data transmission impairment of the first type.

13. A local node as defined in claim 12, wherein, for the particular working transmission line assigned a priority level that is lower than the highest priority level among the two or more working transmission lines suffering from the data transmission impairment of the first type, said control unit is operative to generate an error signal indicative of a data transmission impairment of the first type over the particular working transmission line and send said error signal back to a remote node within the synchronous optical network ring.

14. A local node as defined in claim 13, wherein said local node is operative to detect a data transmission impairment of the first type over a line of either one of said first and second groups of working transmission lines through the exchange of signaling information with the respective one of the first and second remote nodes.

15. A local node as defined in claim 14, wherein, upon detection of a data transmission impairment of the second type between said local node and the first remote node, said control unit is operative to select the particular line having the highest priority level in said first group of working transmission lines, and re-route optical signals from the particular line to said second protection line.

16. A local node as defined in claim 4, wherein the data transmission impairment of the first type is a line failure.

17. A local node as defined in claim 4, wherein the data transmission impairment of the first type is a fiber failure.

18. A local node as defined in claim 4, wherein the data transmission impairment of the second type is a link failure.

19. A local node as defined in claim 4, wherein the data transmission impairment of the second type is a node failure.

20. A method for performing protection switching in a local node of a synchronous optical network ring, said local node including:
   a first group of working transmission lines for exchanging data with a first remote node in the network;
   a first protection line associated with said first group of working transmission lines, said first protection line being capable of exchanging data with the first remote node in the network;
   a second group of working transmission lines for exchanging data with a second remote node in the network, different from the first remote node;
   a second protection line associated with said second group of working transmission lines, said second protection line being capable of exchanging data with the second remote node in the network;
   said method comprising:
   a) monitoring each line of said first and second groups of working transmission lines;
   b) detecting a data transmission impairment of a first type over a particular line of said first group of working transmission lines, and re-routing the exchange of optical signals between said local node and the first remote node from the particular working transmission line to said first protection line;
   c) detecting a data transmission impairment of the second type between said local node and the first remote node, and re-routing optical signals from a particular working transmission line of said first group of working transmission lines to said second protection line.

21. A method as defined in claim 20, said method further including detecting a data transmission impairment of the first type over a particular line of said second group of working transmission lines, and re-routing the exchange of optical signals between said local node and the second remote node from the particular working transmission line to said second protection line.

22. A method as defined in claim 21, said method further including detecting a data transmission impairment of the second type between said local node and the second remote node, and re-routing optical signals from a particular working transmission line of said second group of working transmission lines to said first protection line.

23. A method as defined in claim 22, wherein each line of said first group of working transmission lines is assigned a priority level, whereby one line of said first group of working transmission lines has a higher priority level than another line of the same group.

24. A method as defined in claim 23, wherein, upon detection of a data transmission impairment of the first type over two or more lines of said first group of working transmission lines, said method includes:
   a) selecting one of the two or more working transmission lines suffering from the data transmission impairment of the first type, on the basis of the priority levels of the two or more working transmission lines suffering from the data transmission impairment of the first type;
   b) re-routing optical signals from the selected working transmission line to said first protection line.

25. A method as defined in claim 24, wherein each line of said second group of working transmission lines is assigned a priority level, whereby one line of said second group of working transmission lines has a higher priority level than another line of the same group.

26. A method as defined in claim 25, wherein, upon detection of a data transmission impairment of the first type over two or more lines of said second group of working transmission lines, said method comprises:
   a) selecting one of the two or more working transmission lines suffering from the data transmission impairment of the first type, on the basis of the priority levels of the two or more working transmission lines suffering from the data transmission impairment of the first type;
   b) re-routing optical signals from the selected working transmission line to said second protection line.

27. A method as defined in claim 26, wherein, for each of said first and second groups of working transmission lines, the step of selecting one of the two or more working transmission lines suffering from the data transmission impairment of the first type includes selecting the working transmission line assigned the highest priority level among the two or more working transmission lines suffering from the data transmission impairment of the first type.

28. A method as defined in claim 27, wherein, for the particular working transmission line assigned a priority level that is lower than the highest priority level among the two or more working transmission lines suffering from the data transmission impairment of the first type, said method includes the steps of generating an error signal indicative of a data transmission impairment of the first type over the particular working transmission line and sending said error signal back to a remote node within the synchronous optical network ring.

29. A method as defined in claim 28, wherein said method includes exchanging signaling information with said first and second remote nodes in order to detect a data transmission impairment of the first type over a line of either one of said first and second groups of working transmission lines.

30. A method as defined in claim 29, wherein, upon detection of a data transmission impairment of the second type between said local node and the first remote node, said method comprises the steps of selecting the particular line having the highest priority level in said first group of working transmission lines, and re-routing optical signals from the particular line to said second protection line.

31. A method as defined in claim 30, wherein, upon detection of a data transmission impairment of the second type between said local node and the second remote node, said method comprises the steps of selecting the particular line having the highest priority level in said second group of working transmission lines, and re-routing optical signals from the particular line to said first protection line.

32. A local node for use in a synchronous optical network ring, said local node comprising:
- a first group of working transmission lines for exchanging data with a first remote node in the network;
- a first protection line associated with said first group of working transmission lines, said first protection line being capable of exchanging data with the first remote node in the network;
- a second group of working transmission lines for exchanging data with a second remote node in the network, different from the first node;
- a second protection line associated with said second group of working transmission lines, said second protection line being capable of exchanging data with the second remote node in the network;
- control means operative to monitor said first and second groups of working transmission lines and,
  - a) upon detection of a data transmission impairment of a first type over any one of the lines in the first group of working transmission lines, invoke a first protection switch event causing re-routing of optical signals from the working transmission line on which the data transmission impairment of the first type has been detected to said first protection line;
  - b) upon detection of a data transmission impairment of a second type between said local node and the first remote node, invoke a second protection switch event causing re-routing of optical signals from a particular working transmission line of said first group of working transmission lines to said second protection line.

33. A synchronous optical network including a plurality of nodes, each node comprising:
- a first group of working transmission lines for exchanging data with a first remote node in the network;
- a first protection line associated with said first group of working transmission lines, said first protection line being capable of exchanging data with the first remote node in the network;
- a second group of working transmission lines for exchanging data with a second remote node in the network, the second remote node being different from the first remote node;
- a second protection line associated with said second group of working transmission lines, said second protection line being capable of exchanging data with the second remote node in the network;
- a control unit operative to monitor said first and second groups of working transmission lines and,
  - a) upon detection of a data transmission impairment of a first type over any one of the lines in said first group of working transmission lines, invoke a first protection switch event causing re-routing of optical signals from the working transmission line on which the data transmission impairment of the first type has been detected to said first protection line;
  - b) upon detection of a data transmission impairment of a second type between said local node and the first remote node, invoke a second protection switch event causing re-routing of optical signals from a particular working transmission line of said first group of working transmission lines to said second protection line.

34. A synchronous optical network as defined in claim 33, wherein said control unit is further operative to invoke a third protection switch event upon detection of a data transmission impairment of the first type over any one of the lines in the second group of working transmission lines, the third protection switch event causing re-routing of optical signals from the working transmission line on which the data transmission impairment of the first type has been detected to said second protection line.

35. A synchronous optical network as defined in claim 34, wherein said control unit is further operative to invoke a fourth protection switch event upon detection of a data transmission impairment of the second type between said local node and the second remote node, the fourth protection switch event causing re-routing of optical signal from a particular working transmission line of said second group of working transmission lines to said first protection line.

36. A synchronous optical network as defined in claim 35, wherein said network is a network ring.

* * * * *